United States Patent [19]

Grau

[11] 4,390,783
[45] Jun. 28, 1983

[54] SPECTROSCOPIC ANALYSIS WITH BACKGROUND COMPENSATION

[75] Inventor: James A. Grau, Ridgefield, Conn.

[73] Assignee: Schlumberger Technology Corporation, New York, N.Y.

[21] Appl. No.: 307,930

[22] Filed: Oct. 2, 1981

Related U.S. Application Data

[63] Continuation of Ser. No. 174,969, Aug. 4, 1980.

[51] Int. Cl.³ .............................................. G01V 5/00
[52] U.S. Cl. .............................................. 250/270
[58] Field of Search ............... 250/252, 253, 269, 270; 376/160, 165, 166

[56] References Cited

U.S. PATENT DOCUMENTS

| | | | |
|---|---|---|---|
| 3,521,064 | 7/1970 | Moran et al. | 250/269 |
| 3,739,171 | 6/1973 | Scott | 250/270 |
| 3,780,303 | 12/1973 | Smith, Jr. et al. | 250/270 |
| 3,842,265 | 10/1974 | Pitts, Jr. | 250/270 |
| 4,232,220 | 11/1980 | Hertzog | 250/270 |

OTHER PUBLICATIONS

Hertzog, R. C., "Laboratory and Field Evaluation of an Inelastic-Neutron-Scattering and Capture Gamma Ray Spectroscopy Tool," presented at the 53rd Annual Fall Technical Conference and Exhibition of the Society of Petroleum Engineers of AIME, Oct. 1–3, 1978.

Primary Examiner—Alfred E. Smith
Assistant Examiner—Janice A. Howell
Attorney, Agent, or Firm—Stephen L. Borst

[57] ABSTRACT

The composition of an earth formation is investigated by repetitively irradiating the formation with bursts of incident radiation and generating an unknown energy spectrum from radiation resulting from the interaction of the incident radiation with nuclei of the formation. A background energy spectrum is generated from radiation detected during a time interval adjacent to the interval in which the unknown energy spectrum is measured. A percentage of the background spectrum, shifted to have the best energy-versus-channel number match with that of the unknown spectrum, is then subtracted from the unknown spectrum to produce an improved, unknown spectrum substantially free of background contributions from which an improved, compensated, inelastic neutron interaction log may be generated.

20 Claims, 4 Drawing Figures

SPECTROSCOPIC ANALYSIS WITH BACKGROUND COMPENSATION

This is a continuation of application Ser. No. 174,969 filed on Aug. 4, 1980.

BACKGROUND OF THE INVENTION

1. Field of Invention

The present invention relates in general to nuclear well logging, and pertains in particular to improved methods and apparatus for spectroscopic analysis of inelastic scattering gamma ray energy spectra to provide more accurate information of the composition of earth formations surrounding a well borehole.

2. The Prior Art

Heretofore, various techniques have been utilized to process gamma ray energy spectra for borehole constituent analysis. In the case of inelastic scattering gamma ray energy spectra, it is known that analysis of the spectra to identify the contributions thereto due to carbon and oxygen provides useful information of the presence of oil in a formation.

Additional information concerning the composition of the formation, such as its lithology for instance, is, however, frequently required before an unambiguous determination of the presence of oil can be made. A suitable lithology indicator for this purpose might comprise the ratio of inelastic scattering gamma ray contributions for calcium and silicon.

The derivation of the foregoing information concerning carbon, oxygen, calcium and silicon, and possibly other constituents of the formation and well bore, depends upon accurate constituent analysis of the formation gamma ray spectra. An important and basic technique for performing such analysis is disclosed in U.S. Pat. No. 3,521,064, issued on July 21, 1970, to Moran, et al. In accordance with the Moran et al. teaching, a detected gamma ray energy spectrum for a formation of unknown composition is compared with a composite spectrum made up of weighted standard spectra of the constituents postulated to comprise the formation. The weight coefficients for the standard spectra which give the best fit of the composite spectrum to the unknown spectrum, as determined, for example, by the method of least squares, represent the relative proportions of the constituents in the formation. By appropriate selection and weighting of the standard spectra, the proportions of the constituents of interest, such as carbon, oxygen, calcium, silicon, etc., may be obtained, from which the desired information regarding oil content may be derived.

Although the Moran et al. technique, as disclosed in U.S. Pat. No. 3,521,064, is applicable for the purpose of the present invention and in this respect provides substantial advantages relative to other prior art techniques, the present invention is concerned with methods and apparatus which provide still better results, particularly in connection with the analysis of inelastic scattering gamma ray spectra.

To obtain statistically accurate inelastic scattering gamma ray spectra, it is desirable to irradiate the formation with bursts of neutrons at as high a repetition rate as is practicable so that their time separation is at a minimum. Closely spaced neutron bursts, however, have the disadvantage that gamma rays, originating predominantly from thermal neutron capture reactions between formation constituents and neutrons from one or more preceding bursts, will be present as interfering background during the detection periods for the inelastic scattering gamma rays.

The Moran et al. patent suggests that the capture gamma ray component in the inelastic scattering gamma ray spectrum may be accounted for by predetermining a separate "background" spectrum representative of residual capture gamma radiation from prior bursts. This "Background" would then be included as a standard in the composite spectrum. According to the Moran et al. patent, the standard background spectrum is taken beforehand in a reference borehole or test pit. This, however, does not necessarily reflect the real in situ capture gamma ray spectrum, which varies with change in neutron source strength, sonde environment, sonde performance, etc., and thus may lead to inaccuracies in the constituent proportions obtained from the spectrum matching process.

As evidenced by U.S. Pat. No. 3,780,303 to Smith et al., it has also been proposed in the prior art to detect the level of background gamma radiation in a time interval immediately prior to each neutron burst, and then subtract that level from the inelastic scattering gamma ray counts obtained during the burst.

The background gamma ray count disclosed in the Smith et al. patent, however, reflects only an approximation of the total background level prevailing during the succeeding neutron burst (assuming that the background detection period closely precedes the burst and that the inelastic scattering detection period is short relative to the thermal neutron decay time constant of the formation). Such a count does not afford information of the spectral character or shape of the capture gamma ray spectrum and thus does not accurately compensate the inelatic gamma ray spectrum for the influence of residual capture gamma radiation from prior neutron bursts.

It has further been proposed in U.S. application Ser. No. 869,584, filed Jan. 16, 1978, for R. C. Hertzog et al., now abandoned, and continued as Ser. No. 040,320, filed May 18, 1979, now U.S. Pat. No. 4,317,993, that a background energy spectrum be generated from gamma rays detected during periods between neutron bursts and be utilized to provide one or more standard background spectra for use in the analysis of the inelastic scattering gamma ray spectra in accordance with the aforementioned Moran, et al. practices. The standard background spectra is then updated on a repetitive basis to reflect the current background component in the detected inelastic scattering gamma ray spectrum. The inelastic scattering gamma ray spectrum is thereafter analyzed by comparing it with a composite spectrum, made up of standard spectra of constituents, postulated to comprise the formation, including the background spectra, to determine the proportions in the formation of the postulated constituents.

Finally, it has also been proposed in U.S. Pat. No. 4,232,220 which issued Nov. 4, 1980, to R. C. Hertzog, that the effect of background radiation, within a borehole under investigation, on the inelastic gamma ray measurement, can be accounted for a manner which is substantially independent of the thermal neutron capture time constant of the formation under investigation by taking into consideration variations in the thermal neutron capture gamma ray background spectrum due to changes in environmental parameters in the borehole. A background gamma ray energy spectrum is accumulated during a time interval which immediately follows the time interval in which inelastic intersections are measured. Measurements during this background interval more accurately reflect the thermal background population resulting from lingering thermal neutrons generated during previous high energy neutron pulses and from thermal capture neutrons which are generated within a short time, relative to the neutron capture time constant of the formation, and therefore may be considered as representative of the borehole environment in the vicinity of the detector. Through a simple subtractive step the background information is removed from the measurement obtained during the inelastic gate time interval which is set to encompass the neutron burst, thereby enhancing the inelastic gamma ray measurements derived during the inelastic gate.

SUMMARY OF THE INVENTION

It has been discovered that a significant further improvement can be made in the spectroscopic analysis of inelastic gamma ray spectra by further refinements in the way in which the background energy spectrum is handled. Specifically, it has been recognized that it is appropriate to properly normalize the detected background spectrum and that the detected background spectrum should be adjusted with regard to its energy versus channel calibration before being subtracted so that the background spectrum closely resembles the background portion of the measured gross inelastic energy spectrum.

In a preferred mode of practicing the invention, the adjustment performed is an iterative technique in which the offset of the background spectrum is varied until a goodness of fit parameter is optimized. Furthermore, the magnitude of the background spectrum is normalized by the ratio of the number of background counts in the gross energy spectrum to the number of counts in the background spectrum.

In performing this normalization, some of the elements which contribute to the background are identified and one or more of their elemental estimators are selected. The selected estimators are then applied either individually or in combination to the gross inelastic spectrum and the background spectrum to derive count rates indicative of background in the gross energy spectrum and in the background spectrum from which the above mentioned ratio is formed. Subsequently, the background spectrum is normalized by the ratio and then subtracted from the gross inelastic spectrum in order to determine a net inelastic spectrum. The net spectrum is then compared to a composite spectrum, assembled from a plurality of elemental standard spectra combined in a linear combination according to weighting values determined by the combination of the net inelastic spectrum with the appropriate elemental estimators, to generate a value indicative of the goodness of fit between the two compared spectra. In the event that the goodness of fit is not satisfactory, the iterative process is repeated until the goodness of fit is acceptable. Once acceptible, the elemental weights are output and recorded on a properly depth registered log indicative of the percentage contributions of the constituent elements.

BRIEF DESCRIPTION OF THE DRAWINGS

The present invention may be better understood and its numerous objects and advantages will become apparent to those skilled in the art by reference to the accompanying drawings in which.

DETAILED DESCRIPTION

Figure 1:
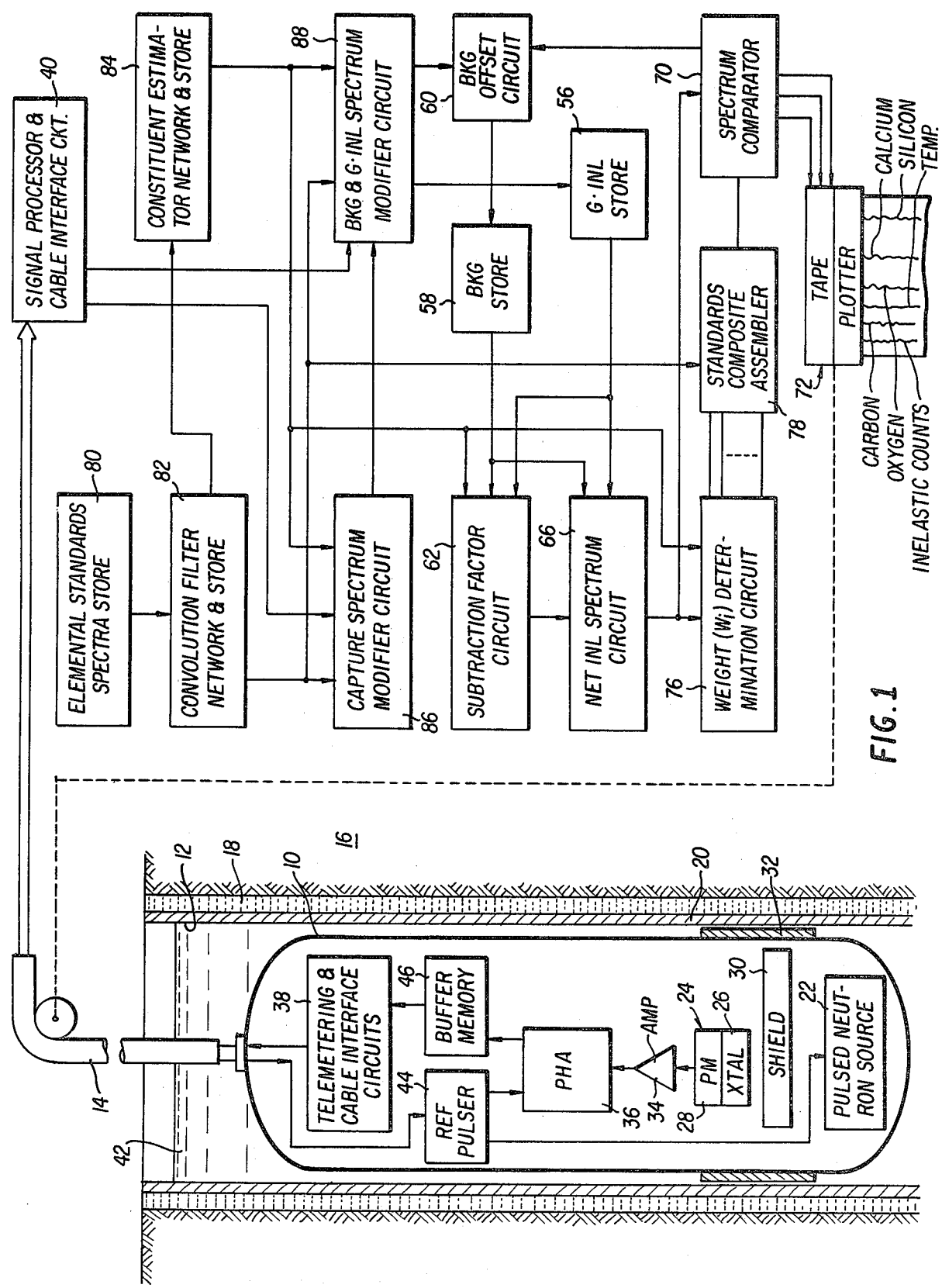
FIG. 1 is a schematic view of an embodiment of a logging apparatus constructed in accordance with the invention.

While the invention is susceptible of various modifications and alternative constructions, there is shown in the drawings, and there will hereinafter be described in detail, a description of the preferred or best known mode of the invention. It is to be understood, however, that the specific description and drawings are not intended to limit the invention to the specific form disclosed. On the contrary, it is intended that the scope of this patent include all modifications and alternative constructions thereof falling within the spirit and scope of the invention as expressed in the appended claims, to the full range of their equivalents.

Referring now to FIG. 1, a representative embodiment of the invention includes a fluid tight, pressure and temperature resistant well tool or sonde 10 that is adapted to be suspended in a well bore 12 by an armored cable 14 for investigating a subsurface earth formation 16. The well bore 12 is illustrated as cased, including the usual annulus of cement 18 and steel casing 20, and a containing a well fluid 42. Although no tubing is shown in the well bore, the tool, if desired, may be sized for through-tubing use. It will be understood that the invention has application also to openhole logging.

The sonde 10 includes a pulsed neutron source 22 for producing primary radiation for the irradiation of the formation, and a radiation detector 24 for the detection of secondary radiation returning from the formations. The neutron source 22 preferably is of the accelerator type described in U.S. Pat. No. 3,461,291 to C. Goodman and No. 3,546,512 to A. H. Frentrop, both of which are commonly owned with this application. This type of neutron source is particularly adapted to generate discrete bursts of high energy or fast neutrons, e.g. at 14 MeV, of controlled duration and repetition rate.

Figure 2:
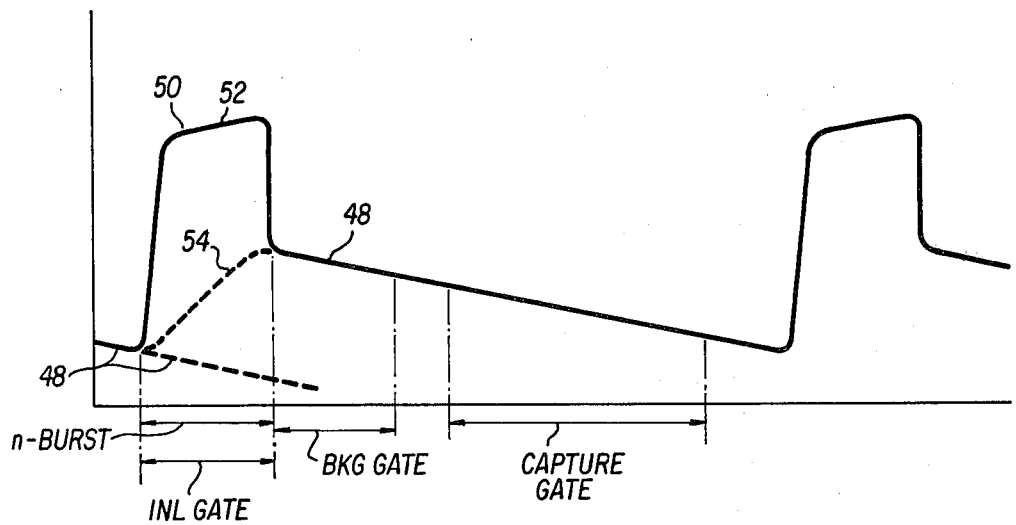
FIG. 2 is a diagrammatic representation of the time distribution of gamma rays resulting from the irradiation of an earth formation with time-spaced bursts of fast neutrons.

FIG. 2 illustrates a typical neutron burst 50 and the resultant gamma ray time distribution which is produced by the interaction of the generated neutrons with the formation constituents through both an inelastic scattering mechanism and a neutron capture mechanism. As can be seen, a capture gamma ray tail 48 persists from a previous burst and timewise extends into the following neutron burst interval. During the neutron burst interval, both inelastic gamma rays 52 and capture gamma rays 54 are produced from the formation, the population of each growing as the neutron burst continues. The capture gamma rays result both from persistent neutrons from the previous burst and from neutrons produced during the burst 50 of interest. When the neutron burst terminates, the production of inelastic gamma rays ceases almost instantaneously while the production of capture gamma rays slowly decays with increasing time. Thus, it can be seen that if inelastic gamma rays are to be detected, the detection or first interval must substantially correspond with the neutron burst and that a significant capture gamma ray background will be present. Furthermore, the average number of capture gamma rays detected as background during the neutron pulse will be somewhat smaller than the number detected during an equivalent second time interval or background gate immediately following the neutron burst.

The detector 24 may be of any construction appropriate to the detection of gamma rays and to the production of a pulse signal in response to each detected gamma ray having an amplitude representative of the energy of the detected gamma ray. Generally, such a detector includes a scintillation crystal 26 which is optically coupled to a photomultiplier tube 28. The crystal is preferably of the thallium-activated sodium iodide type, although any suitable crystal such as thallium or sodium-activated cesium iodide, may be used. Alternatively, a solid state detector, having for example a germanium crystal, might be employed. A neutron shield 30 may be positioned between the source 22 and the detector 24 to reduce bombardment of the detector by neutrons emanating directly from the source.

Electrical power for the sonde 10 is supplied through the cable 14 from a power source (not shown) at the surface. Suitable power sources (also not shown) are also included in the sonde 10 for the purpose of driving the neutron source 22, the detector 24 and other downhole electronics. The sonde 10 may be surrounded by a boron carbide impregnated sleeve 32 located generally in the region of the source 22 and detector 24. The sleeve 32 acts as a shield to minimize the detection of gamma radiation originating from the neutron interactions in the immediate vicinity of the source and the detector. An amplifier 34 acts on the output pulses from the photo-multiplier 28. The amplified photo-multiplier pulses are thereafter applied to a pulse height analyzer (PHA) 36, which may be of any conventional type such as a single ramp (Wilkinson rundown) type. It will be understood to include the usual pulse height discriminators, for a selection of the gamma ray energy range to be analyzed, and linear gating circuits, for control of the time portion of the detector signal train to be analysed.

Pulse height analyzer 36 segregates the detector pulses into predetermined channels according to their amplitude to provide an energy spectrum and supplies signals in suitable digital form representing the amplitude of each analyzed pulse. The digital outputs of PHA 36 are stored in a buffer memory 46 and are then transferred to telemetry and cable interface circuits 38 for transmission over cable 14 to the surface. At the surface the cable signals are received by signal processing and cable interface circuits 40. It will be understood that the circuits 38 and 40 may be of any suitable known construction for encoding and decoding, multiplexing and demultiplexing, amplifying and otherwise processing the signals for transmission to and reception by the uphole electronics. Appropriate circuits are described, for example, in U.S. Pat. No. 4,012,712, issued Mar. 15, 1977 to William B. Nelligan for ∓Systems for Telemetering Well Logging Data".

The operation of the sonde 10 is controlled by signals sent downhole from a master programmer, not shown, located at the surface. These signals are received by a reference pulser 44 which, in response thereto, transmits control signals to the neutron source 22 and to the PHA 36.

Upon receipt of the reference pulses, the pulsing circuit generates a plurality of sharp fire pulses, thereby causing the source 22 to emit correspondingly sharp bursts of fast neutrons. For purposes of constituent analysis of inelastic scattering gamma ray spectra in accordance with the invention, the neutron bursts are preferably of short duration, for example, 18 microseconds, and are repeated at short intervals, for example every 100 micro-seconds or so, to provide satisfactory statistics in the spectrum analysis procedure. The control signals transmitted from the reference pulser 44 to the pulse height analyzer 36 enable the linear gating circuits of the pulse height analyzer during three different time periods in relation to each neutron burst. The first or "burst" or "inelastic" gate, during which inelastic plus background gamma rays are detected, is substantially coincident with a respective neutron burst as shown in FIG. 2. The second, or "background" gate, immediately follows the neutron burst in the preferred embodiment but may actually be located elsewhere, such as prior to the burst. The third, or "capture" detection gate, is enabled at a selected time between neutron bursts. It will be recognized that capture gamma radiation will represent the major background component in the otherwise predominantly inelastic scattered gamma radiation detected during the gating period coincident with the neutron burst.

Since it is desirable for spectral analysis to obtain as pure an inelastic scattering gamma ray spectrum as possible, the presence of the capture background in the inelastic spectrum must be removed. This is done, according to the principles of the invention, by subtracting a fraction of the energy spectrum of the detected gamma rays in the background gate from the inelastic scattering gamma ray spectrum detected during the burst gate. By virtue of this technique, as opposed to the aforementioned prior art compensation techniques of subtracting the gross background counts detected prior to the neutron burst of interest from the inelastic spectrum or of using a laboratory or test pit background standard, the inelastic spectrum is more accurately and correctly compensated for background.

Referring now again to FIG. 1, signals which represent the spectra associated with the inelastic gate, the background gate, and the capture gate are assembled and stored in appropriate circuitry such as the signal processor and cable interfacing circuit 40 for subsequent utilization, which may take place in suitable analog circuitry or in a suitably programmed digital computer such as the PDP-11 computer manufactured by the Digital Equipment Corporation, Maynard, Mass. As a first step, in order for subsequent processing to be accomplished satisfactorily, it is necessary to adjust both the capture, the background, and the inelastic spectra with respect to both gain and offset in order to properly bring the three spectra into roughly the same registration with one another. Accordingly, adjustments are made to the measured spectra with the utilization of a technique of weighted least squares fitting the respective spectra to a spectrum assembled from elemental standard spectra derived under controlled environments.

Before describing in greater detail the particular steps performed in the preferred embodiment of the invention, it is instructive to generally discuss the underlying theory upon which the spectral fitting analysis is based.

Each spectrum, inelastic, background, or capture, obtained with the multichannel analyzer, is recorded as a histogram. The abscissa is the energy axis which is divided into m equal-width energy intervals. (For typical NaI(Tl)-detector resolution, m=256 is sufficient). The ordinate for the ith energy interval is the number of gamma-rays ($n_i$) accumulated for that energy interval in the preferred embodiment. All spectra are represented as m-dimensional vectors, p. The components, $p_i$, of each vector are normalized such that the sum of the $p_i$'s is unity.

In general a formation spectrum, p, can be described as a linear combination of a complete set of s standard descriptor spectra, $p^j$ (j=1, 2, ..., s). Each of these standard spectra may correspond to an element expected to be present in the formation.

The vectors for the standard spectra are mathematically represented by column vectors of an m by s spectra-descriptor matrix, $\rho$, such that $$p = \sum_{j=1}^{s} p^j X_j = \rho \cdot X \quad (1)$$

where X is a vector whose components are the spectroscopic-yield coefficients, $X_j$. Each $X_j$ represents the fractional contribution from the corresponding standard spectrum-descriptor vector, $P^j$, to the total measured spectrum, p. The most significant spectral-response functions required for the background-corrected inelastic spectra are those for the elements C, O, Ca, Si, Fe, Cl, and for the capture spectra are for elements, H, Si, Cl, Ca, Fe, and activation background.

The general problem of spectroscopy-logging analysis is to determine the yield coefficients, $X_j$, which represent the contribution of each element to the observed spectrum. Since matrix $\rho$ is not square (because m>s), it is not possible in general to invert $\rho$ in order to solve for X. Also, the measured spectrum p, contains statistical errors which can be represented by including an error spectrum, $\epsilon$, in Eq. 1, $$p = \sum_{j=1}^{s} p^j X_j + \epsilon = \rho \cdot X + \epsilon \quad (2)$$

By selecting a suitable positive symmetric weighting matrix, W, the weighted statistical error squared is $$\epsilon^T W \epsilon = (p - \rho \cdot X)^T W (p - \epsilon \cdot X) \quad (3)$$

where $\epsilon^T$ is the transpose of $\epsilon$, and $\epsilon^T W \epsilon$ is a number which measures the overall error. The weighted-least-squares solution which minimizes the error in Eq. 3 is given by $$X = (\rho^T W \rho)^{-1} \rho^T W \cdot p \quad (4)$$

The choice of the weighting matrix determines the nature of the least-squares estimate. In order to avoid lengthy matrix inversions for each analysis, the estimate used for W is based on a typical spectrum. Eq. 4 can be rewritten in the form $$X = E \cdot p \quad (5)$$

where $$E = (\rho^T W \rho)^{-1} \rho^T W \quad (6)$$

The matrix, E, consists of s row vectors, $E^j$, each associated with one of the elemental standard descriptor spectra, $p^j$. The vectors, $E^j$, are called linear estimators because the scalar product between the observed spectrum, p, and each of the vectors, $E^j$, gives the fractional contribution, or yield, $X_j$, of the jth element to the observed spectrum.

To generate the set of standard spectra, $p^j$, for use in the descriptor matrix, $\rho$, inelastic and capture spectra are taken in special laboratory formations designed to emphasize the spectral contribution of each given element.

As discussed above, each standard leads to the generation of an associated linear estimator, $E^j$ whose shape reflects the character of the standard and the cross correlations between it and other standards. Thus, the estimator is a type of digital filter that extracts from the observed spectrum, p, the contribution from its associated standard spectrum. For example, both the carbon and oxygen estimators have large positive components where there are peaks in the corresponding standard spectra. The estimators also have negative components. This occurs where a standard anti-correlates with one or more other standards since the estimator for a standard is derived such that it is as independent as possible from estimators for other standards.

Returning now to FIG. 1, the elemental standard spectra are held in store 80. When needed, the standard spectra are read out and degraded and stored in their convolved form by convolution filter network and store 82. Convolution filter network and the process of degrading the elemental standard spectra are the subject of U.S. patent application Ser. No. 065,244 filed Aug. 9, 1979 by Grau et al., entitled, "Methods and Apparatus for Constituent Analysis of Earth Formations" assigned to the assignee of the present invention. Briefly, convolution filter network 82 causes the elemental standard spectra to be degraded in a manner which takes into account the effects of temperature on the detector resolution extant during the detection of the measured spectra. This process recognizes and takes advantage of the fact that a better spectral analysis can be accomplished by weighted least squares fitting of a fit spectrum, comprising a weighted composite of standard spectra, to the unknown spectrum when the fit spectrum has been degraded in a manner which simulates the degradation of the detector resolution caused by elevated temperatures experienced by the measuring apparatus. This is of utmost importance in the oil well logging application as the differences in temperature between the laboratory, where the standard spectra are derived, and the borehole environment can be quite extreme. Additional description of the convolution filter network and method will be set forth hereinbelow.

The degraded standard spectra are next utilized to generate an equal number of constituent or linear estimators in constituent estimator network 84. The estimators which have been defined above as linear estimators whose scaler products with a spectrum give the fractional contributions or yields of specific elements to the observed spectrum are stored in element 84 so as to be available for subsequent process steps.

The next step in the process is illustrated in subsystem 86 in which an iterative search is performed to cause the capture spectrum to be modified with respect to gain and offset so as to minimize the difference between the capture spectrum obtained from the capture gate and the composite spectra assembled from the convolved elemental standard spectra stored in element 82. When the best fit requirement has been met, the gain corresponding to the best fit is delivered to the background and gross inelastic spectrum modifier subsystem circuit 88, which then modifies both the measured background spectrum and the gross inelastic spectrum to have a gain equivalent to the gain determined by element 86. Element 88 then performs a similar iterative search over the offset of the inelastic spectrum to optimize the fit between the inelastic spectrum and a composite standard spectrum. In this manner, values for both gain and offset of the gross inelastic spectrum are generated by circuits 86 and 88. These values of gain and offset are subsequently applied to modify both the background spectrum and the gross inelastic spectrum. The modified gross inelastic spectrum is then delivered to and stored in element 56 for subsequent utilization. The modified background spectrum is delivered to circuit 60. Circuit 60 applies an additional offset to the background spectrum which is then stored in background store 58.

Up to this point, a rough signal reconditioning process has been described. This rough spectrum adjustment or modification is required in order to assure success of the subsequent "fine tuning" adjustment of the background spectrum prior to its subtraction from the gross inelastic spectrum in order to generate a purified net inelastic spectrum which is background free. Briefly, a subtraction factor is generated from the background spectrum, the gross inelastic spectrum, and the constituent estimators. The subtraction factor is a multiplicative fraction indicative of the ratio of an estimate of the counts attributable to capture background found in the inelastic gate to the number of capture background counts measured in the background gate and may be symbolized as follows:

$$F = \frac{NCGINL}{NCBKG} = \frac{\sum_i E_c(i) * GINL(i)}{\sum_i E_c(i) * BKG(i)}$$

where:
NCGINL is the number of capture events in the gross inelastic spectrum; NCBKG is the number of capture events in the background spectrum; $E_c(i)$ is the composite capture estimator at channel i; and GINL(i) and BKG(i) are the number of events at channel i in the gross inelastic and background spectrum, respectively. $E_c(i)$ may be rewritten as $\Sigma_L E_L(i)$ where $E_L(i)$ is the capture estimator at channel i for a particular capture element L (e.g. hydrogen, iron, etc). The vector $E_c$ will ordinarily include the sum of all of the estimators $E_L$ of all of the capture elements expected to contribute to the measured spectrum. However, actual practice may indicate that less than all need be included. Thus, it is conceivable that only the estimator of hydrogen or of hydrogen and iron need be incorporated in this step.

Once the subtraction factor has been determined in element 62, it is then multiplicatively combined in element 66 with the background spectrum from store 58 to normalize the background spectrum and the product is subtracted from the gross inelastic spectrum delivered from store 56 according to the relationship: net INL=-Gross INL−F*BKG$_S$, where BKG$_S$ is the shifted background spectrum. The result is a net inelastic spectrum substantially free of background.

Having now determined the net inelastic spectrum remaining after the subtraction of background from the gross inelastic spectrum, the system now determines whether the optimum amount of an appropriately shifted background spectrum has been used in the subtraction. It does so by determining, from a combination of one or more of the constituent estimators and the net inelastic spectrum, the fractional contribution of each of, or at least some of, the elements which comprise the net inelastic spectrum in element 76. The fractional contributions are then utilized in the standards composite assembler 78 as a recipe for assembling the convolved elemental standards in a linear combination to assemble a composite standard spectrum. The assembled standard composite spectrum and the net inelastic spectrum are then compared in spectrum comparator 70 and a value of goodness of fit derived. If the goodness of fit value which involves a determination of the least squares, is optimum, the information contained in the fractional contributions is output to tape plotter 70, or some other recording device such as a magnetic tape drive, where the fractional contributions of the various elements are recorded in log form. If the goodness of fit is not satisfactory, a control signal is sent from spectrum comparator 70 to the background offset circuit 60 and the entire process is repeated with a different background spectrum baseline offset.

It should be apparent then to those skilled in the art that the system described and disclosed in FIG. 1 performs an iterative search over a background offset in order to minimize and difference between the "fit spectrum", comprising a composite of the degraded standard spectra, and the derived net inelastic spectrum. In each loop of the iteration, the differently shifted background spectrum influences both the value determined for the subtraction factor in circuit 62 and the shape of the net inelastic spectrum in circuit 66. In addition, actual practice may indicate that only a portion of the "fit spectrum" need be compared with the net inelastic spectrum in order to get a best fit. For example, it will be recognized that the region of the spectrum which is most sensitive in the fitting process to an improper background baseline offset is in the region of the hydrogen spectral line. Thus, it may be that only the region of the hydrogen line should be examined in order to achieve a satisfactory fit.

Figure 3:
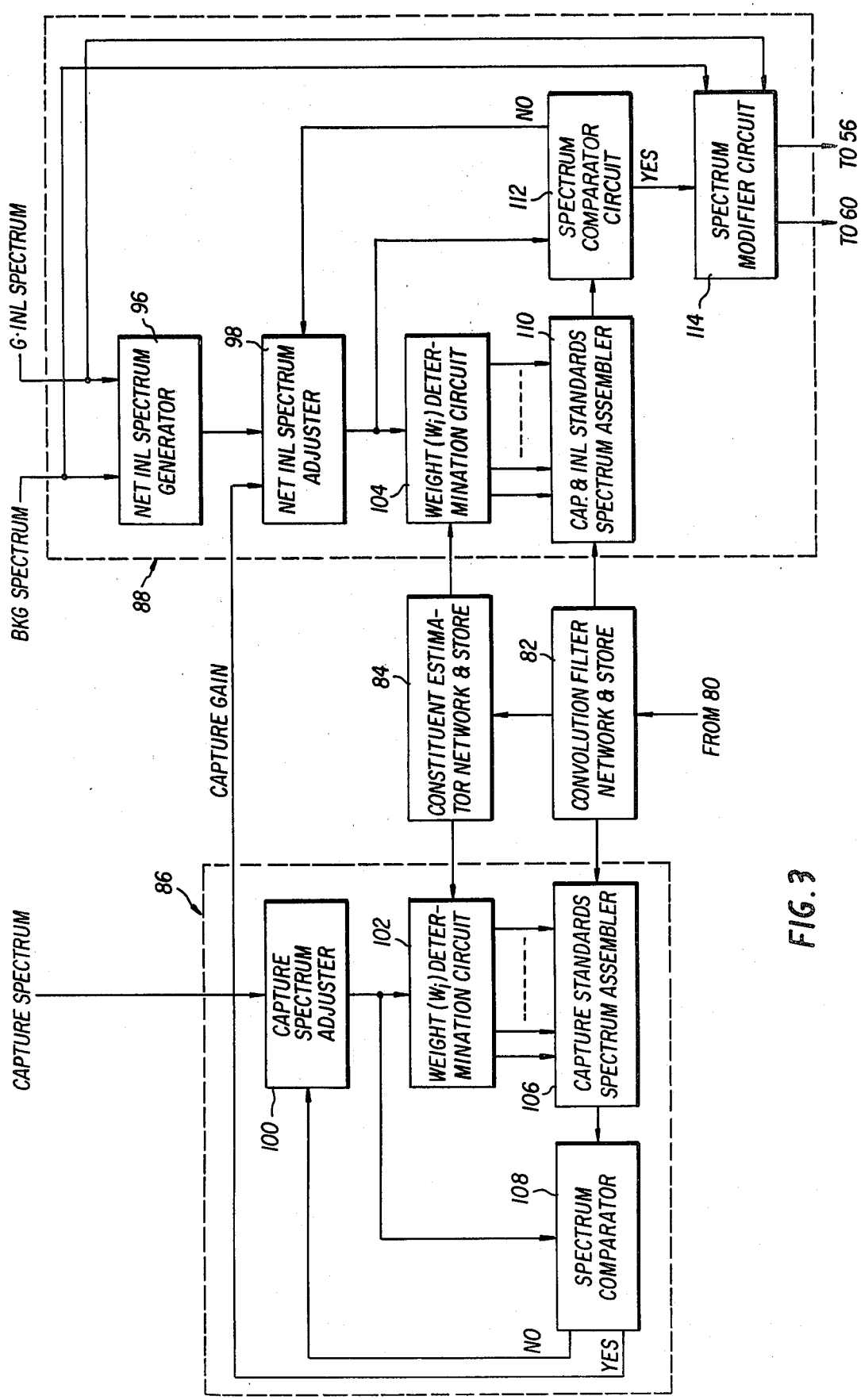
FIG. 3 is a schematic view of a subsystem of the logging apparatus of FIG. 1.

Turning now to an examination of FIG. 3, the capture spectrum modifier circuit and the background and gross inelastic spectrum modifier circuit, 86 and 88 respectively, will be more completely described. Initially, the capture spectrum as originally derived from the measurement apparatus, as well as the background spectrum and the gross inelastic spectrum as originally derived from the measuring apparatus, are delivered to units 86 and 88 respectively. The capture spectrum is adjusted in adjuster 100 by shifting both its gain and offset. The adjusted or shifted capture spectrum is then combined with the convolved constituent estimators for the capture elements as made available from store 84. This combination yields fractional contribution numbers $W_i$ which are subsequently utilized by assembler 106 to assemble a composite standard capture spectrum from the degraded capture standard spectra which have been stored in convolution filter network and store 82. The composite spectrum is then compared in spectrum comparator 108 with the adjusted capture spectrum. If the comparison is not an optimal one, a control signal is delivered to the capture spectrum adjuster 100 which readjusts the capture spectrum with respect to first the gain and then the offset. As a result of this closed loop, it can be seen that an iterative process is carried on in element 86 until an optimal comparison is achieved. At this point, the capture spectrum gain shift, determined to be optimal, is delivered to unit 88 and is subsequently used in the net inelastic spectrum adjustor 98.

As an initial step in the process performed by spectrum adjustor 98, it can be seen that a net inelastic spectrum is produced by generator 96 from the background spectrum and gross inelastic spectrum input data. The net inelastic spectrum is derived in a manner similar to that discussed above in which the background spectrum is normalized by a subtraction factor before being subtracted from the gross inelastic spectrum. At this point the subtraction factor need not be very precise but need yield only a rough estimate of the net inelastic spectrum.

The rough net inelastic spectrum is then modified with respect to its gain by the capture gain delivered from unit 86. In addition, the offset of the net inelastic spectrum is also adjusted in an iterative technique similar to that which occurs in the previously described unit 86. Briefly, both the inelastic and capture estimators are combined with a net inelastic spectrum to yield fractional contribution numbers $W_i$ in unit 104 which are subsequently used in the construction of a capture plus inelastic standard spectrum in assembler 110 from the convolved capture and inelastic standards delivered from store 82. The composite spectrum is then compared in spectrum comparitor circuit 112 with the net inelastic spectrum delivered from element 98. If the comparison is unsatisfactory, i.e., not optimal, a control signal is sent back to element 98 which readjusts only the offset and the process is repeated. In this manner, a series of different composite and net inelastic spectra are determined until the fit between the composite spectrum and the net inelastic spectrum has been optimized. At this point, optimal values for both a gain shift and an offset shift have been determined. Spectrum modifier circuit 114 then applies these gain and offset modifications to the measured background spectrum and the measured gross inelastic spectrum and respectively delivers same to elements 60 and 56 of FIG. 1.

Figure 4:
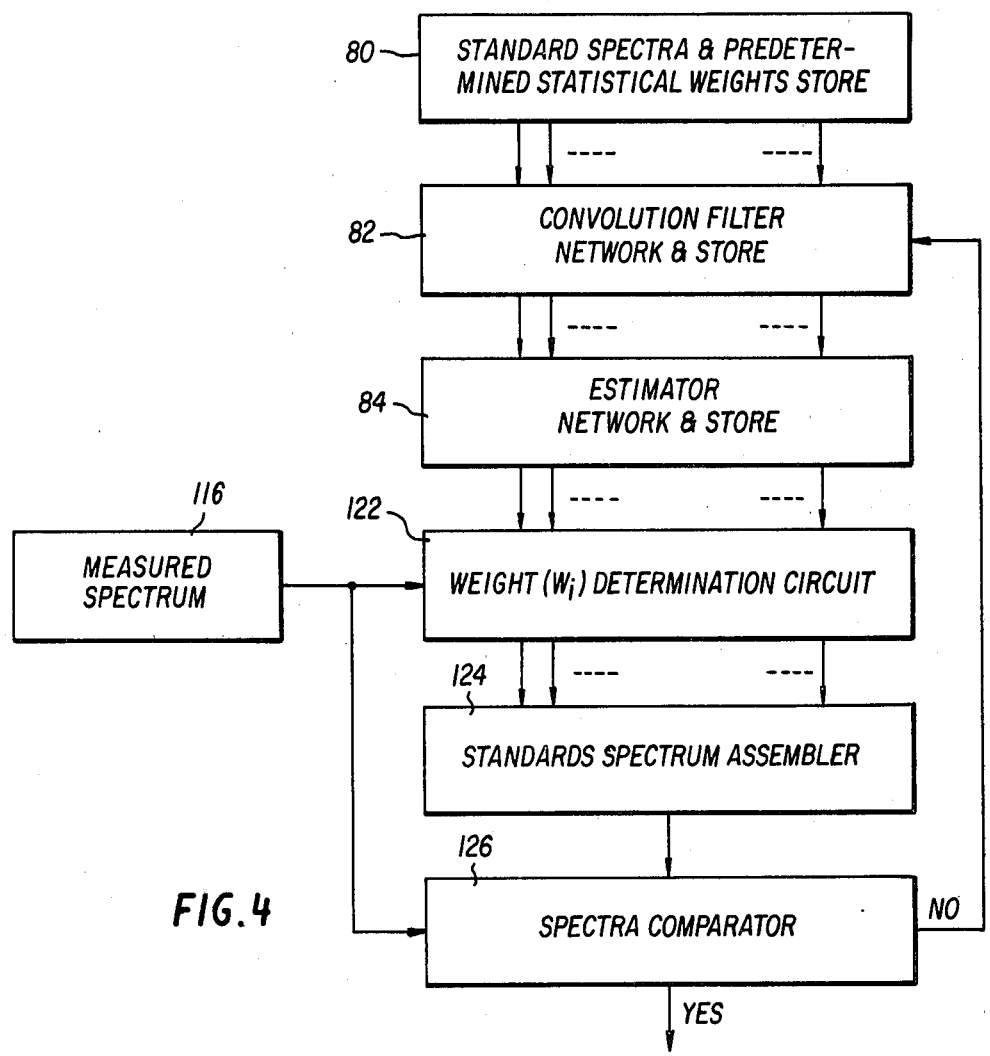
FIG. 4 is a schematic representation of portions of the system and subsystem shown in FIG. 1 and FIG. 3 respectively.

Turning now to an examination of FIG. 4, a brief description of the steps practiced in the convolution of the standard spectra and in the determination of the constituent estimator will be briefly described. Rectangle 80 represents the store in which standard spectra, both capture and inelastic, for all of the elements thought to be of significant importance have been memorized. Additionally, memory 80 includes a typical composite spectrum from which statistical weights are calculated. The standard spectra and the typical composite spectrum are operated on by convolution network 82 to cause their modification in a manner similar to that described in copending application Ser. No. 065,244, filed Aug. 9, 1979 now abandoned and continued as Ser. No. 187,123 filed on Sept. 15, 1980, for Grau, et al, entitled, METHODS AND APPARATUS FOR CONSTITUENT ANALYSIS OF EARTH FORMATIONS and commonly assigned to the assignee of the present invention. The purpose of the convolution filter or degradation filter network is to improve the accuracy of the weighted least squares fitting spectral analysis technique by causing the standard spectra to be degraded in a manner similar to that which occurs as a result of the degraded detector resolution caused by the elevated temperatures experienced by the measuring apparatus.

The degraded or convolved standard spectra and the degraded typical composite spectrum are then utilized in element 84 to generate a set of degraded elemental estimators. The degraded estimators are subsequently utilized by circuit 122 in combination with an unknown spectrum derived from the measuring apparatus 10 to generate a set of fractional contributional values $W_i$. These fractional contributional values are then combined in assembler 124 with the convolved or degraded standard spectra to assemble a composite spectrum which is subsequently compared in spectra comparator 126 to the unknown spectrum. Failure to achieve an optimal goodness of fit causes a control signal to be returned to convolution filter network 82 and the process is iteratively repeated until an optimal fit has been established. Upon the determination of an optimal fit, the convolved standard spectra and the convolved estimators which correspond to the optimal fit are then stored in stores 82 and 84 respectively.

As described in prior co-pending patent application Ser. No. 187,123, the standard spectra and their respective estimators need not necessarily be calculated for each of the many measured spectra. Rather, it may be necessary only to redetermine the degraded standard spectra and their respective degraded estimators only when the temperature of the measuring apparatus changes by an amount exceeding a predetermined value.

What is claimed is:

1. A method for spectroscopically analyzing the elemental constituents of a geological formation, the method comprising the steps of:
   (a) repetitively irradiating the formation with bursts of primary radiation;
   (b) for each burst, detecting secondary radiation emanating from the formation during a first time interval;
   (c) generating a gross energy spectrum from a series of said first time intervals, said gross energy spectrum including a portion due to background;
   (d) for each burst, detecting secondary radiation emanating from the formation during a different, second time interval;
   (e) generating a background spectrum from a series of said second time intervals;
   (f) adjusting said background spectrum to more closely resemble the background portion of said gross energy spectrum by repetitively changing the offset of said background spectrum by different amounts and selecting the changed background spectrum which most closely resembles the background portion of said gross energy spectrum; and
   (g) substantially eliminating said background portion of said gross energy spectrum by combining said gross energy spectrum and said adjusted background spectrum to generate an improved net energy spectrum substantially free of background.

2. The method as recited in claim 1 wherein steps (f) and (g) include the steps of:
   (i) off-setting the baseline of said background spectrum;
   (ii) reducing said gross energy spectrum by said offset background spectrum to generate a net energy spectrum;
   (iii) producing a composite energy spectrum from one or more elemental standard spectra;
   (iv) comparing at least a portion of said net energy spectrum with at least a portion of said composite energy spectrum and determining its goodness of fit; and (v) repeating steps (i) through (iv) with a plurality of different offsets to determine the offset and the corresponding net energy spectrum for which the goodness of fit is optimized.

3. The method as recited in claim 1 or 2 wherein said step of adjusting said background spectrum includes the step of:
   (a) adjusting the magnitude of said background spectrum by a factor proportional to the ratio of the number of background counts in said gross energy spectrum to the number of counts in said background spectrum.

4. The method as recited in claim 3 wherein said step of adjusting the magnitude of said background spectrum includes the steps of:
   (a) combining one or more elemental estimators of those elements thought to be background contributors, to produce a combination estimator;
   (b) combining each of said gross energy spectrum and said background spectrum with said combination estimator and taking the ratios of the resultants to generate a subtraction factor; and
   (c) multiplying said background spectrum by said subtraction factor to generate said background spectrum of adjusted magnitude.

5. The method as recited in claim 3 wherein said step of adjusting the magnitude of said background spectrum includes the steps of:
   (a) identifying some of those elements which contribute to the background;
   (b) from said identified elements, selecting one or more elements and determining their elemental estimators;
   (c) combining each of said gross energy spectrum and said background spectrum with said selected elemental estimators and taking the ratios thereof to generate a subtraction factor; and
   (d) combining said background spectrum and said subtraction factor to generate said background spectrum of adjusted magnitude.

6. The method as recited in claim 1 wherein said second time interval is timewise adjacent to said first time interval.

7. A method for spectroscopically analyzing the elemental constituents of a geological formation, the method comprising the steps of:
   (a) irradiating the formation with a series of bursts of neutrons;
   (b) detecting gamma radiation during each burst of said series to generate a gross gamma ray energy spectrum which comprises an inelastic gamma ray contribution and a capture gamma ray portion;
   (c) detecting gamma radiation during a series of the gates each member of which is timewise adjacent to one member of said series of bursts to generate a background spectrum;
   (d) adjusting said background spectrum to more closely resemble the capture gamma ray portion of said gross gamma ray energy spectrum by repetitively changing the offset of said background spectrum by different amounts and selecting the changed background spectrum which most closely resembles the capture gamma ray portion of said gross gamma ray energy spectrum; and
   (e) reducing said gross gamma ray energy spectrum by said adjusted background spectrum to generate a net inelastic energy spectrum relatively free from background contributions.

8. The method as recited in claim 7 wherein steps (d) and (e) include the steps of:
   (i) off-setting the baseline of said background spectrum;
   (ii) reducing said gross inelastic energy spectrum by subtracting said offset background spectrum to generate a net inelastic energy spectrum;
   (iii) producing a composite energy spectrum from one or more elemental standard spectra;
   (iv) comparing at least a portion of said net inelastic energy spectrum with at least a portion of said composite energy spectrum and determining its goodness of fit; and
   (v) repeating steps (i) through (iv) with a plurality of different offsets to determine the offset and the corresponding set inelastic energy spectrum for which the goodness of fit is optimized.

9. The method as recited in claim 7 or 8 wherein said step of adjusting said background spectrum includes the step of:
   (a) adjusting the magnitude of said background spectrum by a factor proportional to the ratio of the number of background counts in said gross inelastic energy spectrum to the number of counts in said background spectrum.

10. The method as recited in claim 9 wherein said step of adjusting the magnitude of said background spectrum includes the steps of:
    (a) combining one or more elemental estimators of those elements thought to be capture gamma ray background contributors, to produce a combination estimator;
    (b) combining each of said gross inelastic energy spectrum and said background spectrum with said combination estimator and taking the ratios of the resultants to generate a subtraction factor; and
    (c) combining said background spectrum and said subtraction factor to generate said background spectrum of adjusted magnitude.

11. The method as recited in claim 9 wherein said step of adjusting the magnitude of said background spectrum includes the steps of:
    (a) identifying some of those elements which contribute to the capture gamma ray background;
    (b) from said identified elements, selecting one or more elements and determining their elemental estimators;
    (c) combining each of said gross energy spectrum and said background spectrum with said selected elemental estimators and taking the ratios thereof to generate a subtraction factor; and
    (d) combining said background spectrum and said subtraction factor to generate said background spectrum of adjusted magnitude.

12. The method as recited in claim 7 further including the step of deriving elemental constituents of the geological formation from a plurality of said net inelastic energy spectra and generating a log indicative of inelastic elemental formation constituents versus depth therefrom.

13. An apparatus for spectroscopically analyzing the elemental constituents of a geological formation, the apparatus comprising:
    (a) means for repetitively irradiating the formation with bursts of primary radiation;

(b) means for detecting secondary radiation emanating from the formation during a first time interval, and for generating a gross energy spectrum, said gross energy spectrum including a portion due to background;

(c) means for detecting secondary radiation emanating from the formation during a different, second time interval, and generating a background spectrum therefrom;

(d) means for adjusting said background spectrum to more closely resemble the background portion of said gross energy spectrum including means for repetitively changing the offset of said background spectrum by different amounts and for selecting the changed background spectrum which most closely resembles the background portion of said gross energy spectrum; and (e) means for substantially eliminating said background portion of said gross energy, spectrum by combining said gross energy spectrum and said adjusted background spectrum to generate an improved net energy spectrum substantially free of background.

14. The apparatus as recited in claim 13 wherein means (d) and (e) include:

(i) means for off-setting the baseline of said background spectrum;

(ii) means for reducing said gross energy spectrum by said offset background spectrum to generate a net energy spectrum;

(iii) means for producing a composite energy spectrum from one or more elemental standard spectra;

(iv) means for comparing at least a portion of said net energy spectrum with at least a portion of said composite energy spectrum and determining its goodness of fit; and (v) means for optimizing the goodness of fit between said at least a portion of said net energy spectrum and said at least a portion of said composite energy spectrum.

15. The apparatus as recited in claim 13 or 14 wherein said means for adjusting said background spectrum includes:

(a) means for adjusting the magnitude of said background spectrum by a factor proportional to the ratio of the number of background counts in said gross energy spectrum to the number of counts in said background spectrum.

16. The apparatus as recited in claim 15 wherein said means for adjusting the magnitude of said background spectrum includes:

(a) means for combining one or more elemental estimators of those elements thought to be background contributors, to produce a combination estimator;

(b) means for combining each of said gross energy spectrum and said background spectrum with said combination estimator and taking the ratios of the resultants to generate a subtraction factor; and (c) means for multiplying said background spectrum by said subtraction factor to generate said background spectrum of adjusted magnitude.

17. The apparatus as recited in claim 16 further including means for deriving elemental constituents of the geological formation from a plurality of said net inelastic energy spectra and for generating a log indicative of inelastic elemental formation constituents versus depth therefrom.

18. A method for spectroscopically analyzing the elemental constituents of a geological formation, the method comprising the steps of:

(a) repetitively irradiating the formation with bursts of primary radiation;

(b) for each burst, detecting secondary radiation emanating from the formation during a first time interval;

(c) generating a gross energy spectrum from a series of said first time intervals, said gross energy spectrum including a portion due to background;

(d) for each burst, detecting secondary radiation emanating from the formation during a different, second time interval;

(e) generating a background spectrum from a series of said second time intervals;

(f) adjusting said background spectrum to more closely resemble the background portion of said gross energy spectrum by adjusting the magnitude of said background spectrum by a factor proportional to the ratio of the number of background counts in said gross energy spectrum to the number of counts in said background spectrum; and (g) reducing said background portion of said gross energy spectrum by combining said gross energy spectrum and said adjusted background spectrum to generate an improved net energy spectrum.

19. The method as recited in claim 18 wherein said step of adjusting the magnitude of said background spectrum includes the steps of:

(a) combining one or more elemental estimators of those elements thought to be background contributors, to produce a combination estimator;

(b) combining each of said gross energy spectrum and said background spectrum with said combination estimator and taking the ratios of the resultants to generate a subtraction factor; and (c) multiplying said background spectrum by said subtraction factor to generate said background spectrum of adjusted magnitude.

20. The method as recited in claim 18 wherein said step of reducing the magnitude of said background spectrum includes the steps of:

(a) identifying some of those elements which contribute to the background;

(b) from said identified elements, selecting one or more elements and determining their elemental estimators;

(c) combining each of said gross energy spectrum and said background spectrum with said selected elemental estimators and taking the ratios thereof to generate a subtraction factor; and (d) combining said background spectrum and said subtraction factor to generate said background spectrum of adjusted magnitude.

* * * * *